(12) United States Patent
Han et al.

(10) Patent No.: US 12,457,482 B2
(45) Date of Patent: Oct. 28, 2025

(54) ELECTRONIC DEVICE AND METHOD FOR PERFORMING BLUETOOTH COMMUNICATION FOR CONTROLLING EXTERNAL ELECTRONIC DEVICE BASED ON POSITION INFORMATION WITHIN WIRELESS ENVIRONMENT

(71) Applicant: Samsung Electronics Co., Ltd., Suwon-si (KR)

(72) Inventors: Sangwook Han, Suwon-si (KR); Junho Lee, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 17/967,400

(22) Filed: Oct. 17, 2022

(65) Prior Publication Data

US 2023/0164531 A1    May 25, 2023

Related U.S. Application Data

(63) Continuation of application No. PCT/KR2022/013400, filed on Sep. 6, 2022.

(30) Foreign Application Priority Data

Nov. 23, 2021    (KR) .......................... 10-2021-0162523

(51) Int. Cl.
*H04W 8/00* (2009.01)
*H04W 4/029* (2018.01)
(Continued)

(52) U.S. Cl.
CPC ............. *H04W 4/80* (2018.02); *H04W 4/029* (2018.02); *H04W 4/33* (2018.02); *H04W 8/005* (2013.01)

(58) Field of Classification Search
CPC ......... H04W 4/80; H04W 4/33; H04W 4/029; H04W 8/00; H04W 8/005
See application file for complete search history.

(56) References Cited

U.S. PATENT DOCUMENTS 11,553,071 B2    1/2023    Shibao
11,659,626 B2    5/2023    Park et al.
(Continued)

FOREIGN PATENT DOCUMENTS

EP    3989612 A1    4/2022
JP    6333224 B2    5/2018
(Continued)

OTHER PUBLICATIONS

International Search Report dated Dec. 12, 2022, issued in an International Patent Application No. PCT /KR2022/013400.
(Continued)

*Primary Examiner* — Tuan H Nguyen
(74) *Attorney, Agent, or Firm* — Jefferson IP Law, LLP

(57) ABSTRACT

An electronic device is provided. The electronic device includes a communication circuit for Bluetooth low energy (BLE), at least one memory, and at least one processor, when the instructions are executed, is configured to broadcast first advertising packets, receive second advertising packets at least including a control command for media playable in the electronic device, transmit a first signal for identifying whether the first external electronic device is included in a predetermined area from a second external electronic device, via the communication circuit to the second external electronic device, receive a second signal generated in response to the first signal, perform, in response to receiving the second signal indicating that the first external electronic device is included in the predetermined area via the communication circuit, a control command for the media, and
(Continued)

transmit a third advertising packet for indicating to perform the control command for the media.

12 Claims, 11 Drawing Sheets

(51) Int. Cl.
*H04W 4/33* (2018.01)
*H04W 4/80* (2018.01)

(56) References Cited

U.S. PATENT DOCUMENTS

| | | | |
|---|---|---|---|
| 2017/0064491 A1 | 3/2017 | Mirza et al. | |
| 2017/0223579 A1 | 8/2017 | Lee et al. | |
| 2020/0128620 A1 | 4/2020 | Han et al. | |
| 2020/0137542 A1 | 4/2020 | Jung et al. | |
| 2021/0312029 A1* | 10/2021 | Ulrich | G06F 21/35 |
| 2022/0095419 A1 | 3/2022 | Park et al. | |

FOREIGN PATENT DOCUMENTS

| | | |
|---|---|---|
| KR | 10-0686735 B1 | 2/2007 |
| KR | 10-1549027 B1 | 9/2015 |
| KR | 10-1657654 B1 | 9/2016 |
| KR | 10-2017-0040240 A | 4/2017 |
| KR | 10-1755310 B1 | 7/2017 |
| KR | 10-1777052 B1 | 9/2017 |
| KR | 10-2019-0102894 A | 9/2019 |
| KR | 10-2020-0017302 A | 2/2020 |
| KR | 10-2020-0144759 A | 12/2020 |
| KR | 10-2600892 B1 | 11/2023 |
| WO | 2018/222024 A1 | 12/2018 |
| WO | 2020/220121 A1 | 11/2020 |

OTHER PUBLICATIONS

Indoor positioning system, https://en.wikipedia.org/wiki/Indoor_positioning_system.
Bluetooth Location Tracking & Positioning, https://www.inpixon.com/technology/standards/bluetooth-low-energy.
Bluetooth Indoor Positioning, ublox, Dec. 15, 2020, https://www.u-blox.com/en/technologies/bluetooth-indoor-positioning.
Martin Woolley, Bluetooth Direction Finding, A Technical Overview, Version: 1.0.2, Feb. 22, 2021.
Ankush A. Kalbandhe et al., Indoor Positioning System using Bluetooth Low Energy, IEEE, Dec. 19-21, 2016, Pune, India.
Ultra-Wideband Positioning & Sensor Technology, https://www.inpixon.com/technology/standards/ultra-wideband.
Syed Naveen Altaf Ahmed et al., UWB positioning accuracy and enhancements, IEEE, Nov. 5-8, 2017, Penang, Malaysia https://ieeexplore.ieee.org/stamp/stamp.jsp?tp=&arnumber=8227939.
Bluetooth, Specifications, https://www.bluetooth.com/ko-kr/specifications/specs/core-specification/.
Microchip Developer, Bluetooth® Low Energy Discovery Process, https://microchipdeveloper.com/wireless:ble-link-layer-discovery.
Everythingrf, What is Beamforming?, https://www.everythingrf.com/community/what-is-beamforming.
4G/LTE—Beam Forming, https://www.sharetechnote.com/html/Handbook_LTE_BeamForming.html.
1 Extended European Search Report dated Jul. 9, 2024, issued in a European Patent Application No. 22898788.9.
Intention to Grant dated Feb. 28, 2025, issued in European Application No. 22 898 788.9.

* cited by examiner

ELECTRONIC DEVICE AND METHOD FOR PERFORMING BLUETOOTH COMMUNICATION FOR CONTROLLING EXTERNAL ELECTRONIC DEVICE BASED ON POSITION INFORMATION WITHIN WIRELESS ENVIRONMENT

CROSS-REFERENCE TO RELATED APPLICATION(S)

This application is a continuation application, claiming priority under § 365(c), of an International application No. PCT/KR2022/013400, filed on Sep. 6, 2022, which is based on and claims the benefit of a Korean patent application number 10-2021-0162523, filed on Nov. 23, 2021, in the Korean Intellectual Property Office, the disclosure of which is incorporated by reference herein in its entirety.

TECHNICAL FIELD

The following descriptions relates to an electronic device and a method for performing Bluetooth communication for controlling an external electronic device based on position information in a wireless environment.

BACKGROUND ART

Bluetooth low energy (BLE) may provide reduced power consumption and at least a similar or often greater communication range between connected devices compared to legacy Bluetooth (or classic Bluetooth). The BLE may be provided on an industrial, scientific, and medical (ISM) radio band.

DISCLOSURE

Summary

In accordance with an aspect of the disclosure, an electronic device is provided. The electronic device includes a communication circuit for Bluetooth low energy (BLE), at least one memory configured to store instructions, and at least one processor operatively coupled with the communication circuit, wherein the at least one processor, when the instructions are executed, may be configured to broadcast first advertising packets via the communication circuit, receive, via the communication circuit from a first external electronic device, second advertising packets at least including a control command for media playable in the electronic device, transmit, in response to receiving the second advertising packets, a first signal for identifying whether the first external electronic device is included in a predetermined area from a second external electronic device, via the communication circuit to the second external electronic device, wherein the first external electronic device is distinct from the second external electronic device, receive, from the second external electronic device via the communication circuit, a second signal generated in response to the first signal, perform, in response to receiving the second signal indicating that the first external electronic device is included in the predetermined area via the communication circuit, a control command for the media, and transmit, via the communication circuit to the first external electronic device, a third advertising packet for indicating to perform the control command for the media.

In accordance with another aspect of the disclosure, an electronic device is provided. The electronic device includes a communication circuit for Bluetooth low energy (BLE), at least one memory configured to store instructions, and at least one processor operatively coupled with the communication circuit, wherein the at least one processor, when the instructions are executed, may be configured to receive first advertising packets via the communication circuit from a first external electronic device, broadcast, in response to receiving the first advertising packets, second advertising packets for identifying whether a position of the electronic device is located within a predetermined area from a second external electronic device, via the communication circuit to the second external electronic device, transmit, via the communication circuit to the first external electronic device, a third advertising packet at least including a control command for media playable in the first external electronic device, and receive, from the first external electronic device via the communication circuit, a fourth advertising packet for indicating that the control command is performed by the first external electronic device in response to the third advertising packet on a condition that the position of the electronic device is located within the predetermined area from the second external electronic device.

In accordance with another aspect of the disclosure, a method of an electronic device is provided. The method includes a communication circuit for a Bluetooth low energy (BLE) may comprise broadcasting first advertising packets via the communication circuit, receiving, via the communication circuit from a first external electronic device, second advertising packets at least including a control command for media playable in the electronic device, transmitting, in response to receiving the second advertising packets, a first signal for identifying whether the first external electronic device is included in a predetermined area from a second external electronic device, via the communication circuit to the second external electronic device, wherein the first external electronic device is distinct from the second external electronic device, receiving, from the second external electronic device via the communication circuit, a second signal generated in response to the first signal, performing, in response to receiving the second signal indicating that the first external electronic device is included in the predetermined area via the communication circuit, a control command for the media; and transmitting, via the communication circuit to the first external electronic device, a third advertising packet for indicating to perform the control command for the media.

MODE FOR INVENTION

Figure 1:
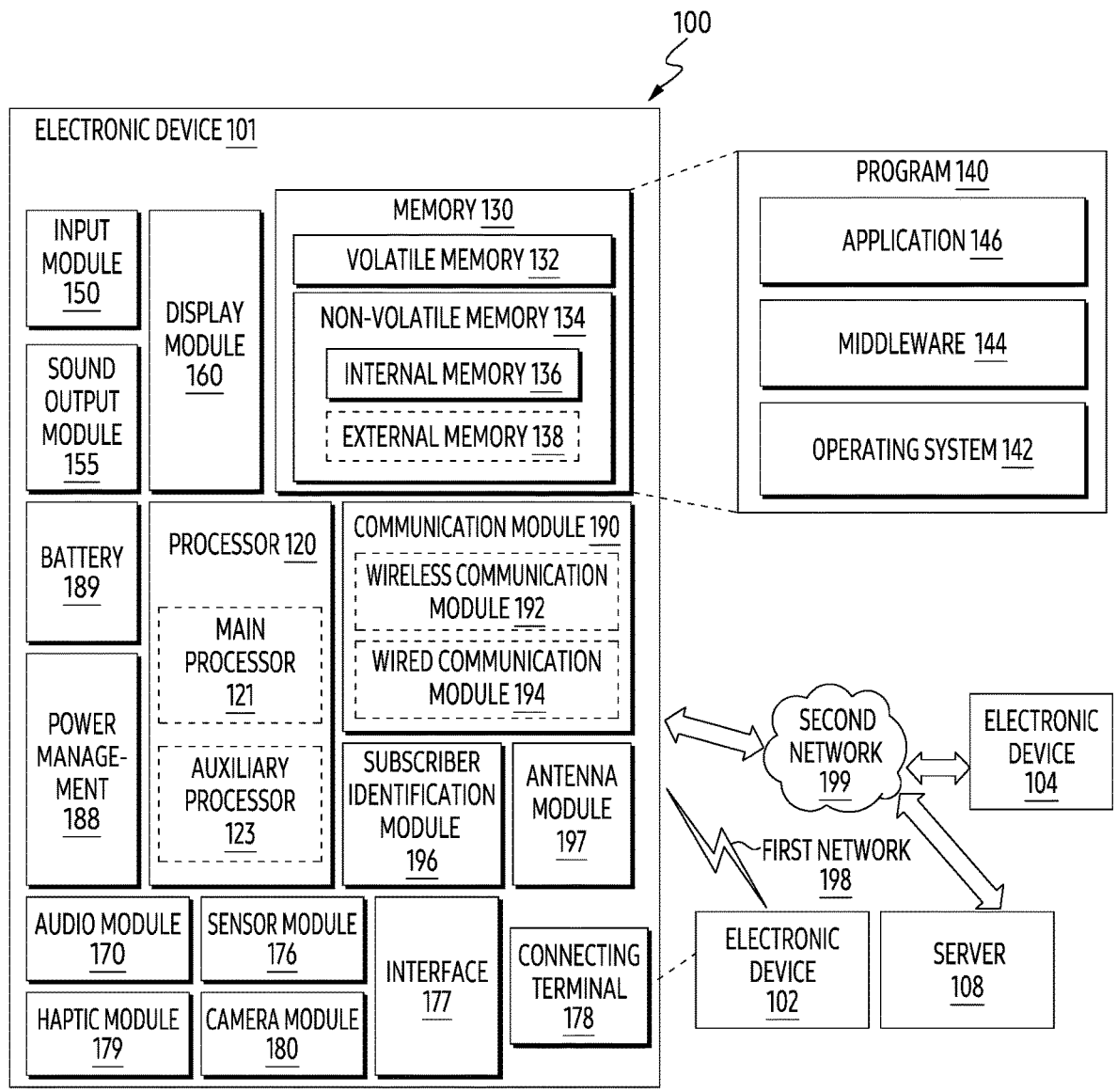
FIG. 1 is a block diagram of an electronic device in a network environment according to an embodiment of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The Bluetooth device may be controlled through an electronic device that is connected 1:1 and has completed pairing. For example, in the case of a Bluetooth device for media play, media control is possible through only the electronic device in which the pairing has been completed.

When another electronic device attempts to control the Bluetooth device paired with the electronic device, an inconvenience of disconnecting the existing pairing connection between the Bluetooth device and the electronic device and performing pairing again between the other electronic device and the Bluetooth device is caused.

Figure 2:
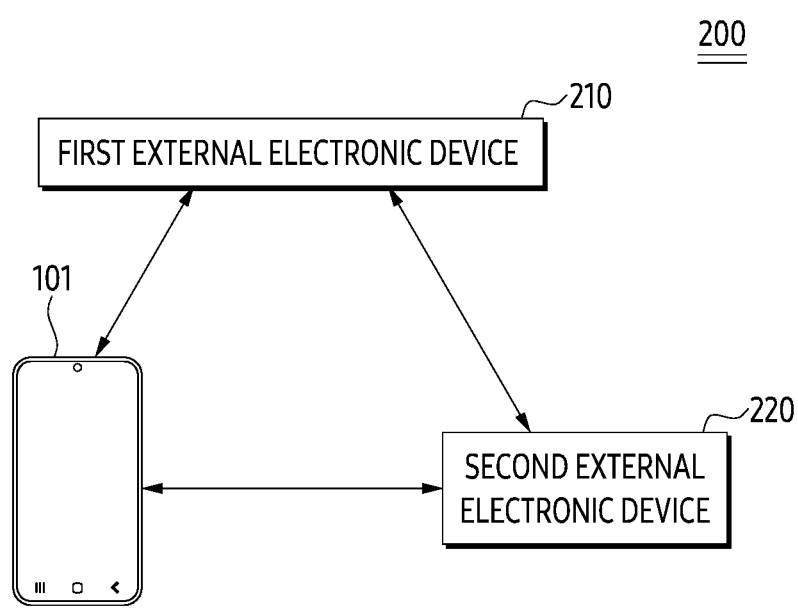
FIG. 2 illustrates an environment including an electronic device, a first external electronic device, and a second external electronic device according to an embodiment of the disclosure.

FIG. 2 illustrates an environment including an electronic device, a first external electronic device, and a second external electronic device according to an embodiment of the disclosure.

Referring to FIG. 2, a wireless environment 200 may include the electronic device 101, a first external electronic device 210, and a second external electronic device 220. The electronic device 101 may correspond to the electronic device 101 of FIG. 1.

According to an embodiment of the disclosure, the electronic device 101 may communicate with the first external electronic device 210. The first external electronic device 210 may be a device capable of providing media content. For example, the first external electronic device 210 may correspond to a Bluetooth speaker and an audio video navigation (AVN) device in a vehicle. The communication may refer to a connectionless communication based on a BLE. For example, the electronic device 101 may transmit an advertising packet including a control command for media content to the first external electronic device 210, before transmitting an advertising packet including a protocol data unit (PDU) of CONNECT_REQ to the first external electronic device 210. The media content may refer to multimedia content playable in the first external electronic device 210. The media content may at least include a song, a video, and a picture. The control command may include a command for media content controlled by the first external electronic device 210. For example, the control command may correspond to a command for indicating any one of a volume up, a volume down, play next song, play previous song, play current song, and pause current song for media content. For another example, the electronic device 101 may receive an advertising packet indicating a result of a control command for the media content from the first external electronic device 210. The advertising packet may include information for indicating whether the control command for the media content is performed by the first external electronic device 210 or the first external electronic device 210 rejects the control command.

According to an embodiment of the disclosure, the electronic device 101 may transmit and receive a BLE packet to and from the second external electronic device 220. The second external electronic device 220 may correspond to an indoor positioning system (IPS) device for identifying a position of the external device (e.g., the electronic device 101) in an indoor area. The BLE packet may correspond to an advertising packet. For example, the BLE packet may be an advertising packet corresponding to a protocol data unit (PDU) of advertising extended indications (ADV_EXT_IND). The second external electronic device 220 may identify the position of the electronic device 101 in response to receiving the advertising packet from the electronic device 101. For example, the second external electronic device 220 may identify whether the electronic device 101 is included in a predetermined area from the second external electronic device 220 based on the advertising packet.

According to an embodiment of the disclosure, the first external electronic device 210 may communicate with the second external electronic device 220. The communication may be a BLE communication. For example, the first external electronic device 210 may transmit a data packet of a first signal to the second external electronic device 220. The first signal may include information for determining whether to perform a control command received from the electronic device 101 based on the position of the electronic device 101. The information for determining whether to perform the control command received from the electronic device 101 may be referred to as Bluetooth authentication information. The first signal may include information requesting to identify whether the electronic device 101 is included within a predetermined area from the second external electronic device 220. The second external electronic device 220 may transmit a data packet of the second signal to the first external electronic device 210 in response to the first signal. The second signal may include information indicating whether the electronic device 101 is included within a predetermined area from the second external electronic device 220. In other words, the second signal may include information indicating a Bluetooth authentication result of the electronic device 101. For example, when the electronic device 101 is identified as being located outside the predetermined area, the second external electronic device 220 may transmit the second signal indicating a failure of the Bluetooth authentication to the first external electronic device 210. For another example, when the electronic device 101 is identified as being located within the predetermined area, the second external electronic device 220 may transmit the second signal indicating a success of the Bluetooth authentication to the first external electronic device 210.

According to an embodiment of the disclosure, the second external electronic device 220 may identify the position of the electronic device 101. The second external electronic device 220 may receive advertising packets corresponding to a protocol data unit (PDU) of the ADV_EXT_IND from the electronic device 101, and identify the position of the electronic device 101 based on the received times and the received strengths at which the packets are received. The second external electronic device 220 may determine whether the electronic device 101 is Bluetooth authenticated based on the identified position of the electronic device 101. For example, when the position of the identified electronic device 101 is identified within the predetermined area, the second external electronic device 220 may identify the electronic device 101 as a Bluetooth authenticated device. For another example, when the position of the identified electronic device 101 is identified outside the predetermined area, the second external electronic device 220 may identify the electronic device 101 as a Bluetooth unauthenticated device.

Figure 3:
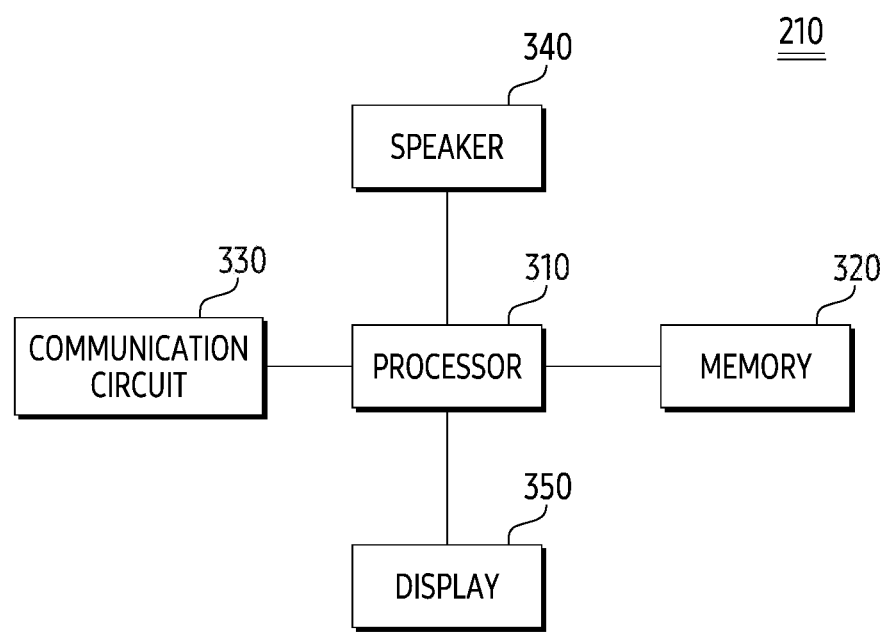
FIG. 3 is a simplified block diagram of a first external electronic device according to an embodiment of the disclosure.

FIG. 3 is a simplified block diagram of a first external electronic device according to an embodiment of the disclosure.

Referring to FIG. 3, the first external electronic device 210 may include a processor 310, a memory 320, a communication circuit 330, a speaker 340, and a display 350.

The processor 310 within the first external electronic device 210 may be operatively coupled to the memory 320 configured to store instructions. The processor 310 within the first external electronic device 210 may be operatively coupled to the communication circuit 330 used for communication with an external electronic device (e.g., electronic device 101).

According to an embodiment of the disclosure, the processor 310 within the first external electronic device 210 may broadcast an advertising packet to establish a communication link between the first external electronic device 210 and an external electronic device (e.g., the electronic device 101 and/or the second external electronic device 220). For example, the advertising packet may be used by the electronic device 101 and/or the second external electronic device 220 to scan the first external electronic device 210. The PDU of the advertising packet broadcast may correspond to ADV_IND.

According to an embodiment of the disclosure, the processor 310 within the first external electronic device 210 may establish a communication connection with the second external electronic device 220 through the communication circuit 330. For example, the first external electronic device 210 may establish a communication connection with the second external electronic device 220 by receiving an advertising packet including a PDU of CONNECT_REQ from the second external electronic device 220.

According to an embodiment of the disclosure, the processor 310 within the first external electronic device 210 may receive an advertising packet including a control command from the electronic device 101 through the communication circuit 330. The control command may include a command for media content playable in the first external electronic device 210. For example, the control command may correspond to a command for indicating any one of a volume up, a volume down, play next song, play previous song, play current song, and pause current song for media content.

According to an embodiment of the disclosure, the processor 310 within the first external electronic device 210 may identify whether to process the control command in response to an advertising packet including the control command. Since the first external electronic device 210 is a step before establishing a Bluetooth connection with the electronic device 101, the first external electronic device 210 may identify processing of the control command based on whether the electronic device 101 is Bluetooth authenticated. For example, when the electronic device 101 that has transmitted the control command is a Bluetooth authenticated device, the processor 310 may control media content according to the control command. When the electronic device 101 that has transmitted the control command is a Bluetooth unauthenticated device, the first external electronic device 210 may bypass the control command.

According to an embodiment of the disclosure, the processor 310 within the first external electronic device 210 may transmit a first signal requesting Bluetooth authentication to the second external electronic device 220 through the communication circuit 330. As described above, since the first external electronic device 210 has established a Bluetooth connection with the second external electronic device 220, the first signal may correspond to a data packet. The first signal may at least include information for requesting Bluetooth authentication of the electronic device 101. For example, the first signal may include a media access control (MAC) address for specifying the electronic device 101.

According to an embodiment of the disclosure, the processor 310 within the first external electronic device 210 may receive a second signal including a Bluetooth authentication result from the second external electronic device 220 through the communication circuit 330. Since the first external electronic device 210 has established a Bluetooth connection with the second external electronic device 220, the second signal may correspond to a data packet. The second signal may at least include information capable of indicating whether the electronic device 101 is Bluetooth authenticated. For example, the second signal may include 1 bit. For example, when the electronic device 101 is a Bluetooth authenticated device by being included in a predetermined area from the second external electronic device 220, the 1 bit may correspond to a logic value of 1. For example, when the electronic device 101 is a Bluetooth unauthenticated device by being included outside the predetermined area from the second external electronic device 220, the 1 bit may correspond to a logic value of 0.

According to an embodiment of the disclosure, the processor 310 within the first external electronic device 210 may identify whether the control command is performed based on the second signal and broadcast an advertising packet indicating a result of the execution. For example, when the electronic device 101 is a Bluetooth unauthenticated device, the processor 310 may discard the control command and broadcast the advertising packet including information indicating the discard. For another example, when the electronic device 101 is a Bluetooth authenticated device, the processor 310 may perform the control command and broadcast the advertising packet including information indicating the execution. The electronic device 101 may identify whether to perform a control command on the media content received from the first external electronic device 210 by receiving the advertising packet.

According to an embodiment of the disclosure, the processor 310 within the first external electronic device 210 may provide media content. For example, the processor 310 may output an audio signal of the media content through the speaker 340, and may display a visual object of the media content through the display 350. According to various embodiments of the disclosure, the media content may be received from another electronic device. For example, the first external electronic device 210 may establish a Bluetooth connection with the other electronic device different from the electronic device 101. For example, the other electronic device may correspond to a device that most recently completed a Bluetooth connection with the first external electronic device 210.

Figure 4A:
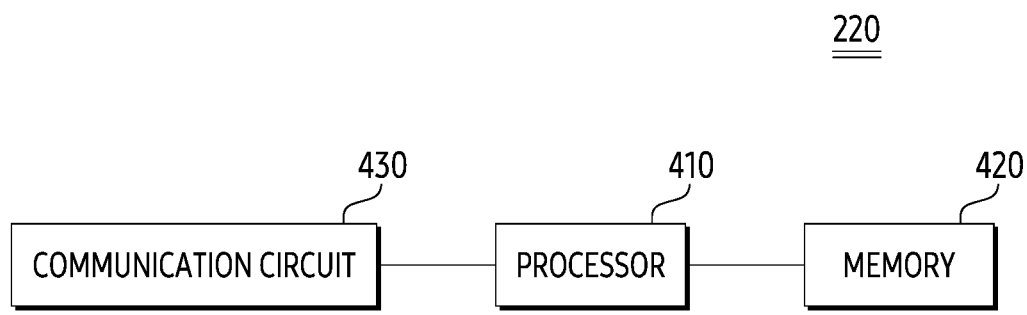
FIG. 4A is a simplified block diagram of a second external electronic device according to an embodiment of the disclosure.

FIG. 4A is a simplified block diagram of a second external electronic device according to an embodiment of the disclosure.

Figure 4B:
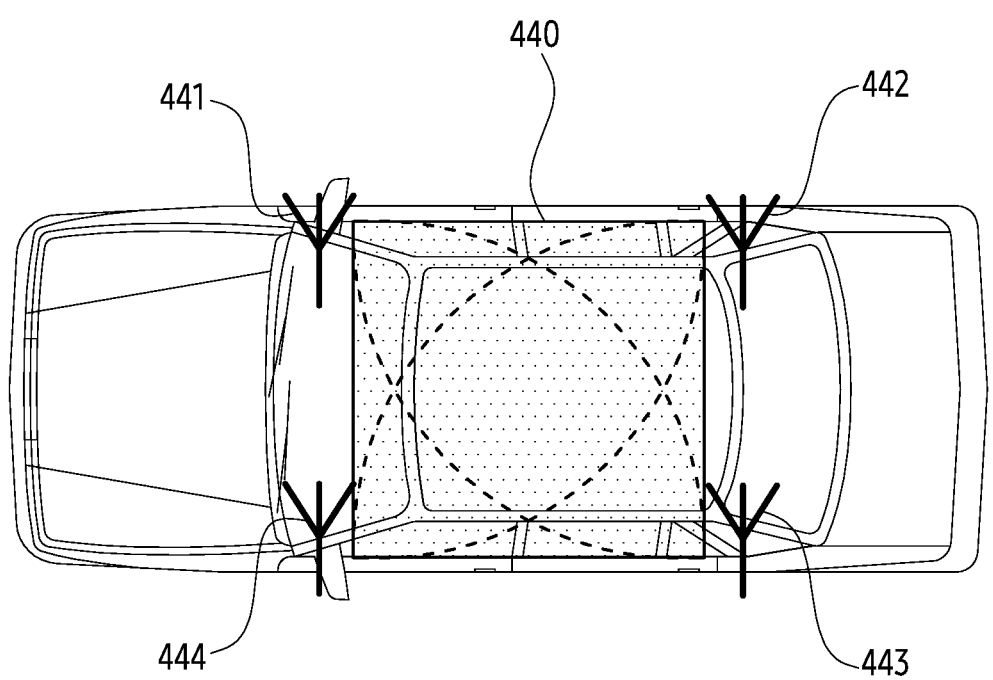
FIG. 4B illustrates a second external electronic device being implemented in a vehicle according to an embodiment of the disclosure.

FIG. 4B illustrates a second external electronic device being implemented in a vehicle according to an embodiment of the disclosure.

Figure 4C:
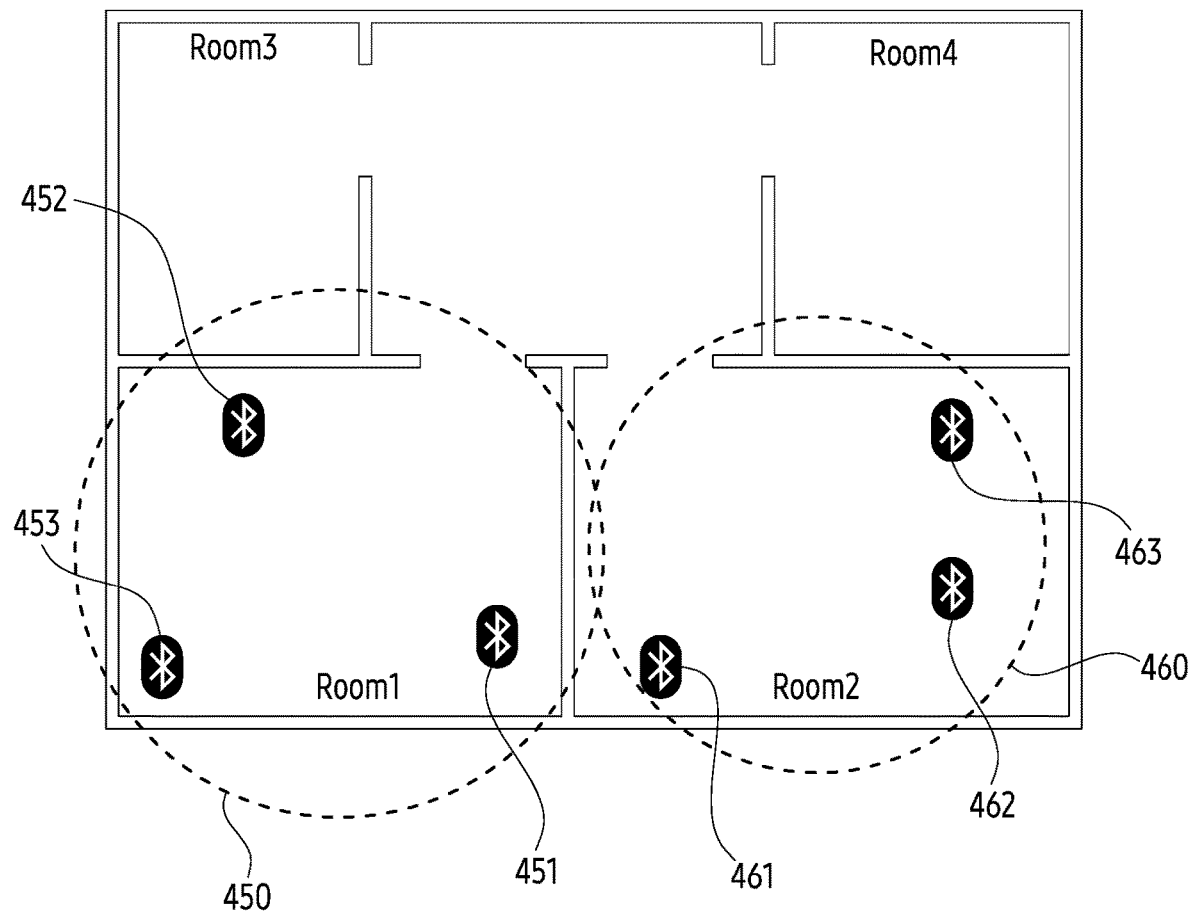
FIG. 4C illustrates a second external electronic device being implemented in a house according to an embodiment of the disclosure.

FIG. 4C illustrates a second external electronic device being implemented in a house according to an embodiment of the disclosure.

Referring to FIG. 4A, the second external electronic device 220 may include a processor 410, a memory 420, and a communication circuit 430.

According to an embodiment of the disclosure, the processor 410 within the second external electronic device 220 may be operatively coupled to the memory 420 configured to store instructions. The processor 410 within the second external electronic device 220 may be operatively coupled to the communication circuit 430 used for communication with an external electronic device (e.g., the first external electronic device 210).

According to an embodiment of the disclosure, the processor 410 within the second external electronic device 220 may establish a communication connection with the first external electronic device 210 through the communication circuit 430. For example, the second external electronic device 220 may establish a communication connection with the first external electronic device 210 by transmitting an advertising packet including a PDU of CONNECT_REQ to the first external electronic device 210.

According to an embodiment of the disclosure, the processor 410 within the second external electronic device 220 may receive a first signal from the first external electronic device 210. The first signal may correspond to a data packet requesting whether the electronic device 101 is Bluetooth authenticated. The first signal may include information for identifying an electronic device (e.g., the electronic device 101) that is the target of Bluetooth authentication. For example, the first signal may include information on a MAC address of the electronic device 101.

According to an embodiment of the disclosure, the processor 410 in the second external electronic device 220 may transmit a second signal to the first external electronic device 210. The second signal may be a data packet generated in response to the first signal. For example, the second signal may include information indicating whether a device (e.g., electronic device 101) corresponding to a MAC address included in the first signal is included in a predetermined area from the second external electronic device 220. When the electronic device 101 is included in the predetermined area, the processor 410 may identify the electronic device 101 as a Bluetooth authenticated device and transmit a second signal including information indicating the identification to the first external electronic device 210. When the electronic device 101 is not included in the predetermined area, the processor 410 may identify the electronic device 101 as a Bluetooth unauthenticated device and transmit a second signal including information indicating the identification to the first external electronic device 210.

According to an embodiment of the disclosure, the memory 420 may store the MAC address of the Bluetooth authenticated device. The second external electronic device 220 may receive advertising packets for identifying direction from the electronic device 101 through the communication circuit 430. The advertising packets for identifying direction may include a PDU of ADV_EXT_IND. The processor 410 of the second external electronic device 220 may identify whether the electronic device 101 is included in a predetermined area from the second external electronic device 220 based on the received time and received strength of advertising packets for identifying direction received through the communication circuit 430. In response to identifying that the electronic device 101 is included in the predetermined area, the second external electronic device 220 may store the MAC address of the electronic device 101 included in the advertising packets for identifying direction in the memory 420, as authentication information.

According to an embodiment of the disclosure, the communication circuit 430 may include a plurality of antennas. Referring to FIG. 4B together, the communication circuit 430 may include a first antenna 441, a second antenna 442, a third antenna 443, and a fourth antenna 444. Referring to FIG. 4B, the second external electronic device 220 may be implemented inside the vehicle. The processor 410 may identify received strengths of the advertising packet of the ADV_EXT_IND received through the first antenna 441 to the fourth antennas 444. For example, the received strength of the advertising packet measured by the first antenna 441 may be the first strength. The processor 410 may estimate a distance at which the electronic device 101 is spaced apart from the first antenna 441 based on the first strength. For example, the received strength of the advertising packet measured by the second antenna 442 may be the second strength. The processor 410 may estimate a distance at which the electronic device 101 is spaced apart from the second antenna 442 based on the second strength. For example, the received strength of the advertising packet measured by the third antenna 443 may be the third strength.

The processor 410 may estimate a distance at which the electronic device 101 is spaced apart from the third antenna 443 based on the third strength. For example, the received strength of the advertising packet measured by the fourth antenna 444 may be the fourth strength. The processor 410 may estimate a distance at which the electronic device 101 is spaced apart from the fourth antenna 444 based on the fourth strength. The processor 410 may identify an approximate position of the electronic device 101 based on the first strength to fourth strength. The processor 410 may form a circle by a distance estimated from each of the first antenna 441 to the fourth antennas, and identify that the electronic device 101 is located in an area in which four circles are common. Referring to FIG. 4B, the first antenna 441 to the fourth antenna 444 may form an area 440. The area 440 may be referred to in various terms including an indoor positioning system (IPS) area, an authentication area, and a security area. The second external electronic device 220 may identify the electronic device 101 as a Bluetooth authenticated device in response to identifying that the electronic device 101 is located within the area 440. In other words, when the electronic device 101 is located in the area 440, the electronic device 101 may control media content of the first external electronic device 210 without exchanging advertising packets of CONNECT_REQ with the first external electronic device 210. According to various embodiments of the disclosure, the size and shape of the area 440 may vary according to the disposition of the first antenna 441 to the fourth antenna 444.

Referring to FIG. 4C together, the second external electronic device 220 may be disposed in Room 1 and/or Room 2. The communication circuit 430 of the second external electronic device 220 may include a plurality of antennas corresponding to a first area 450 for covering the Room 1. The plurality of antennas may include a first antenna 451, a second antenna 452, and a third antenna 453. Referring to FIG. 4C, the second external electronic device 220 may be disposed in Room 1 and/or Room 2. The communication circuit 430 may include a plurality of antennas corresponding to the second area 460 for covering the Room 2. The plurality of antennas may include a first antenna 461, a second antenna 462, and a third antenna 463. According to an embodiment of the disclosure, the communication circuit 430 for covering at least a partial area may include at least three antennas.

According to various embodiments of the disclosure, the user gripping the electronic device 101 may move between the Room 1 and the Room 2. For example, when the user enters Room 1, the communication circuit 430 may identify that the electronic device 101 is located inside the first area 450 based on the advertising packet received through the first antenna 451 to the third antenna 453 of Room 1. The advertising packet may correspond to an advertising packet for identifying a direction broadcast by the electronic device 101, when the user wants to control media playing of the first Bluetooth speaker (not shown) located inside Room 1 after entering Room 1, the first Bluetooth speaker (not shown) may transmit the first signal to the second external electronic device 220 disposed in Room 1. In this case, the first Bluetooth speaker (not shown) may have already completed the Bluetooth connection with the second external electronic device 220 disposed in the Room 1. The second external electronic device 220 may identify that the electronic device 101 is located in the first area 450 in response to the first signal. The second external electronic device 220 may transmit a second signal for indicating that the electronic device 101 is a Bluetooth authenticated device based on the identification to the first Bluetooth speaker (not shown). The electronic device 101 may control media content of the first Bluetooth speaker (not shown) without performing a Bluetooth connection with the first Bluetooth speaker (not shown).

According to various embodiments of the disclosure, the electronic device 101 may be moved from Room 1 to Room 2. In response to the electronic device 101 entering Room 2, the second external electronic device 220 of Room 2 may identify the entry of the electronic device 101. For example, a communication circuit (e.g., the communication circuit 430 of FIG. 4A) included in the second external electronic device 220 of Room 2 may identify that the electronic device 101 is located inside the second area 460 based on advertising packets received through the first antenna 461 to the third antenna 463 of Room 2. When the user wants to control media playing of a second Bluetooth speaker (not shown) located inside Room 2 after entering Room 2, the second Bluetooth speaker Room 2 may transmit the first signal to the second external electronic device 220 disposed in Room 2. In this case, the second Bluetooth speaker Room 2 may have already completed the Bluetooth connection with the second external electronic device 220 of Room 2. The second external electronic device 220 of the Room 2 may transmit a second signal for indicating that the second electronic device is a Bluetooth authenticated device based on that the electronic device 101 is located inside the second area 460, to the second Bluetooth speaker (not shown) in response to the first signal. The electronic device 101 may control media content of the second Bluetooth speaker (not shown) without performing a Bluetooth connection with the second Bluetooth speaker (not shown). According to the above-described, the electronic device 101 may control media content without need to perform pairing with a first Bluetooth speaker (not shown) and/or a second Bluetooth speaker (not shown) whenever moving the room, by identifying the position and broadcasting that the electronic device is a Bluetooth authenticated device by second external electronic device 220.

Figure 5:
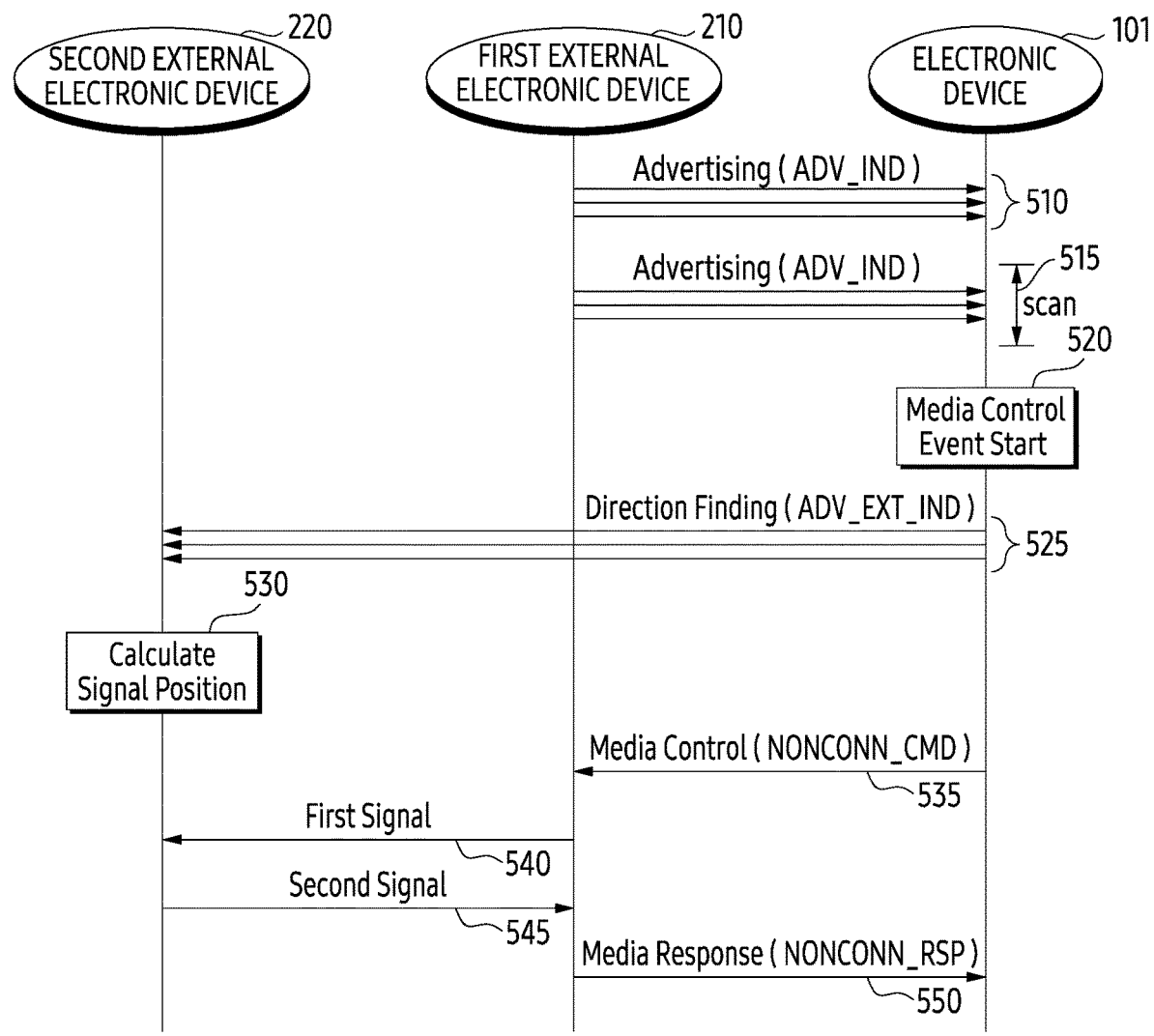
FIG. 5 illustrates a signal exchange diagram occurring within a wireless environment according to an embodiment of the disclosure.

FIG. 5 illustrates a signal exchange diagram occurring within a wireless environment according to an embodiment of the disclosure.

Referring to FIG. 5, in operation 510, the first external electronic device 210 may broadcast advertising packets. The advertising packets may be used by an external device (e.g., electronic device 101) to identify the first external electronic device 210. For example, the advertising packets broadcasted in operation 510 may include a PDU of ADV_IND.

In operation 515, the electronic device 101 may perform a scan for searching for a Bluetooth-connectable device. The electronic device 101 may perform a scan to identify an external device (e.g., the first external electronic device 210) at predetermined intervals. In operation 515, the electronic device 101 may receive advertising packets broadcasted from the first external electronic device 210 while scanning. The electronic device 101 may identify the first external electronic device 210 based on the advertising packets. For example, the electronic device 101 may obtain a MAC address of the first external electronic device 210.

In operation 520, the electronic device 101 may detect a media control event. The media control event may be an event for controlling media content playable in the first external electronic device 210 identified in operation 515. For example, in response to identifying the first external electronic device 210 in operation 515, the electronic device 101 may provide a pop-up notification to a user through a display (e.g., the display module 160 of FIG. 1). The pop-up notification may include a visual object indicating that the first external electronic device 210 is identified near the electronic device 101 and media played in the first external electronic device 210 may be controlled. For another example, the electronic device 101 may execute a predetermined application in response to the identification of an external device (e.g., a first external electronic device 210) providing media content. The predetermined application may be configured to display a user interface for media control of an external device (e.g., a first external electronic device 210) identified at a short distance of the electronic device 101. The electronic device 101 may identify the occurrence of the media control event in response to receiving a user input requesting media control of the first external electronic device 210.

In operation 525, the electronic device 101 may broadcast advertising packets for identifying direction. The advertising packets for identifying direction may be packets including a PDU of ADV_EXT_IND. The advertising packets for identifying direction may include a constant tone extension (CTE).

In operation 530, the second external electronic device 220 may calculate a signal position. The signal may correspond to advertising packets for direction identification broadcast from the electronic device 101. According to an embodiment of the disclosure, the second external electronic device 220 may receive advertising packets for direction identification and perform IQ sampling based on the CTE. The second external electronic device 220 may obtain an angle of departure and/or an angle of arrival of the electronic device 101 based on the IQ sampling. According to an embodiment of the disclosure, the second external electronic device 220 may identify how far the electronic device 101 is located from each of a plurality of antennas based on the received strength of advertising packets for direction identification. The second external electronic device 220 may calculate the position of the electronic device 101 by using the obtained information on the angle of departure and/or the angle of arrival and the estimated distance based on the received strength. As a result of the calculation, when it is identified that the electronic device 101 is located within a predetermined area, the second external electronic device 220 may identify the electronic device 101 as a Bluetooth authenticated device and store the MAC address of the electronic device 101 as authentication information in the memory 420.

In operation 535, the electronic device 101 may broadcast an advertising packet for media control. The advertising packet for media control may include a new type of PDU. For example, the advertising packet for media control may include a PDU of NONCONN_CMD. The NONCONN_CMD may have a value of any one among the reserved bits of the PDU type field. For example, the NONCONN_CMD may have a "1001" value of the PDU type field.

In operation 540, the electronic device 101 may transmit the first signal to the second external electronic device 220 in response to receiving advertising for media control. The first signal may include information requested to identify whether a device (e.g., electronic device 101) that broadcasts an advertising packet for media control corresponds to a Bluetooth authenticated device. For example, the first signal may include a MAC address of an advertising packet for media control. Since the first external electronic device 210 was already established a Bluetooth connection with the second external electronic device 220 for position identification of the electronic device 101, the first signal may correspond to a data packet.

In operation 545, the second external electronic device 220 may transmit the second signal to the first external electronic device 210 in response to receiving the first signal. The second signal may include information indicating whether the device (e.g., electronic device 101) that broadcasted an advertising packet for media control is a Bluetooth authenticated device. The second external electronic device 220 may identify whether a matching MAC address exists among the MAC addresses stored in the memory 420 based on the MAC address included in the first signal. For example, when a MAC address included in the first signal exists among the MAC addresses stored in the memory 420, the second external electronic device 220 may identify a device (e.g., the electronic device 101) that broadcasted an advertising packet for media control is located within a predetermined area and is a Bluetooth authenticated device. The second external electronic device 220 may transmit the second signal including information indicating that the electronic device 101 is a Bluetooth authenticated device to the first external electronic device 210.

In operation 550, the first external electronic device 210 may broadcast an advertising packet for a media response. The advertising packet for media control may include a new type of PDU. For example, the advertising packet for media control may include a PDU of NONCONN_RSP. The NONCONN_RSP may have a value of any one of the reserved bits of the PDU type field. For example, the NONCONN_CMD may have a "1010" value of the PDU type field. The advertising packet for a media response may include information indicating whether a control command included in the advertising packet for media control broadcasted in operation 535 has been performed. For example, when the electronic device 101 has been identified as a Bluetooth authenticated device by including within the predetermined area, the first external electronic device 210 may perform the control command, and may include information indicating that the control command has been performed in the advertising packet for the media response.

Figure 6:
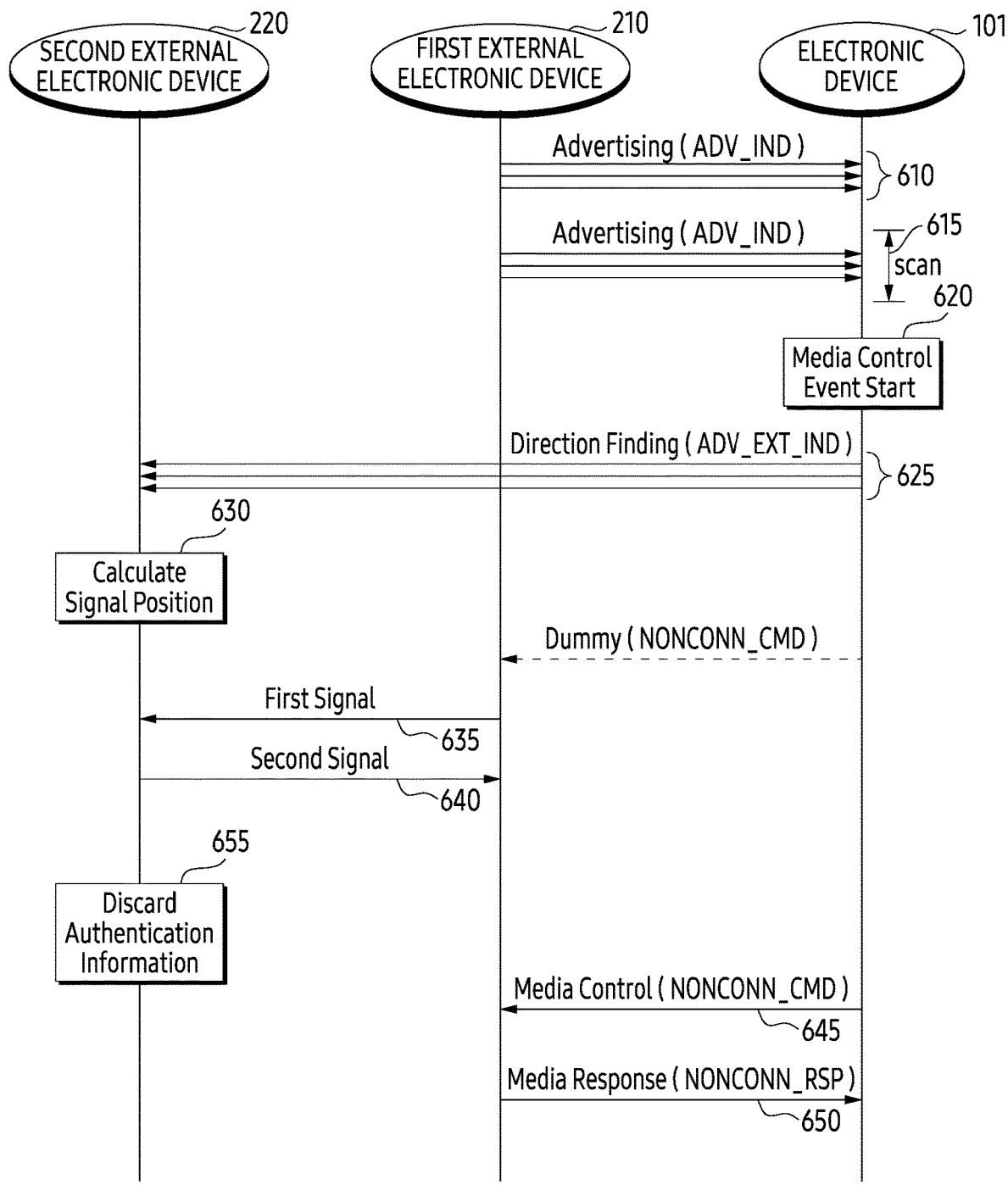
FIG. 6 illustrates a signal exchange diagram occurring in a wireless environment according to an embodiment of the disclosure.

FIG. 6 illustrates a signal exchange diagram occurring in a wireless environment according to an embodiment of the disclosure.

Referring to FIG. 6, in operation 610, the first external electronic device 210 may broadcast advertising packets. Operation 610 may correspond to operation 510 illustrated in FIG. 5.

In operation 615, the electronic device 101 may perform a scan for searching for a Bluetooth connectable device. Operation 615 may correspond to operation 515 illustrated in FIG. 5.

In operation 620, the electronic device 101 may detect a media control event. The media control event may be an event for controlling media content playable in the first external electronic device 210 identified in operation 515. Operation 620 may correspond to operation 520 illustrated in FIG. 5.

In operation 625, the electronic device 101 may broadcast advertising packets for direction identification. Operation 625 may correspond to operation 525 illustrated in FIG. 5. In operation 630, the second external electronic device 220 may calculate a signal position. Operation 630 may correspond to operation 530 illustrated in FIG. 5.

According to various embodiments of the disclosure, the electronic device 101 may broadcast an advertising packet for dummy control. The advertising packet for the dummy control may include a PDU identical to the advertising packet for the media control. For example, the advertising packet for dummy control may include a PDU of NON-CONN_CMD. The advertising packet for dummy control may include dummy data. For example, the AdvData field in the payload of the advertising packet may include dummy data. The first external electronic device 210 may transmit a first signal to the second external electronic device 220 in response to receiving the advertising packet for dummy control. For example, in operation 635, the first external electronic device 210 may transmit a first signal to the second external electronic device 220. Operation 635 may correspond to operation 540 illustrated in FIG. 5.

In operation 640, the first external electronic device 210 may receive a second signal from the second external electronic device 220. Operation 640 may correspond to operation 545 illustrated in FIG. 5.

In operation 655, the second external electronic device 220 may discard the authentication information. The second external electronic device 220 may transmit information indicating that the device (e.g., the electronic device 101) for broadcasting an advertising packet for media control is a Bluetooth authenticated device to the first external electronic device 210 through operations 635 and 640. Accordingly, in operation 640, the second external electronic device 220 may discard the authentication information in response to transmitting the second signal to the first external electronic device 210. For example, the second external electronic device 220 may delete the MAC address included in the first signal from the memory 420.

In operation 645, the electronic device 101 may broadcast an advertising packet for media control. Operation 645 may correspond to operation 535 illustrated in FIG. 5.

In operation 650, the first external electronic device 210 may broadcast an advertising packet for a media response. Operation 650 may correspond to operation 550 illustrated in FIG. 5.

Figure 7:
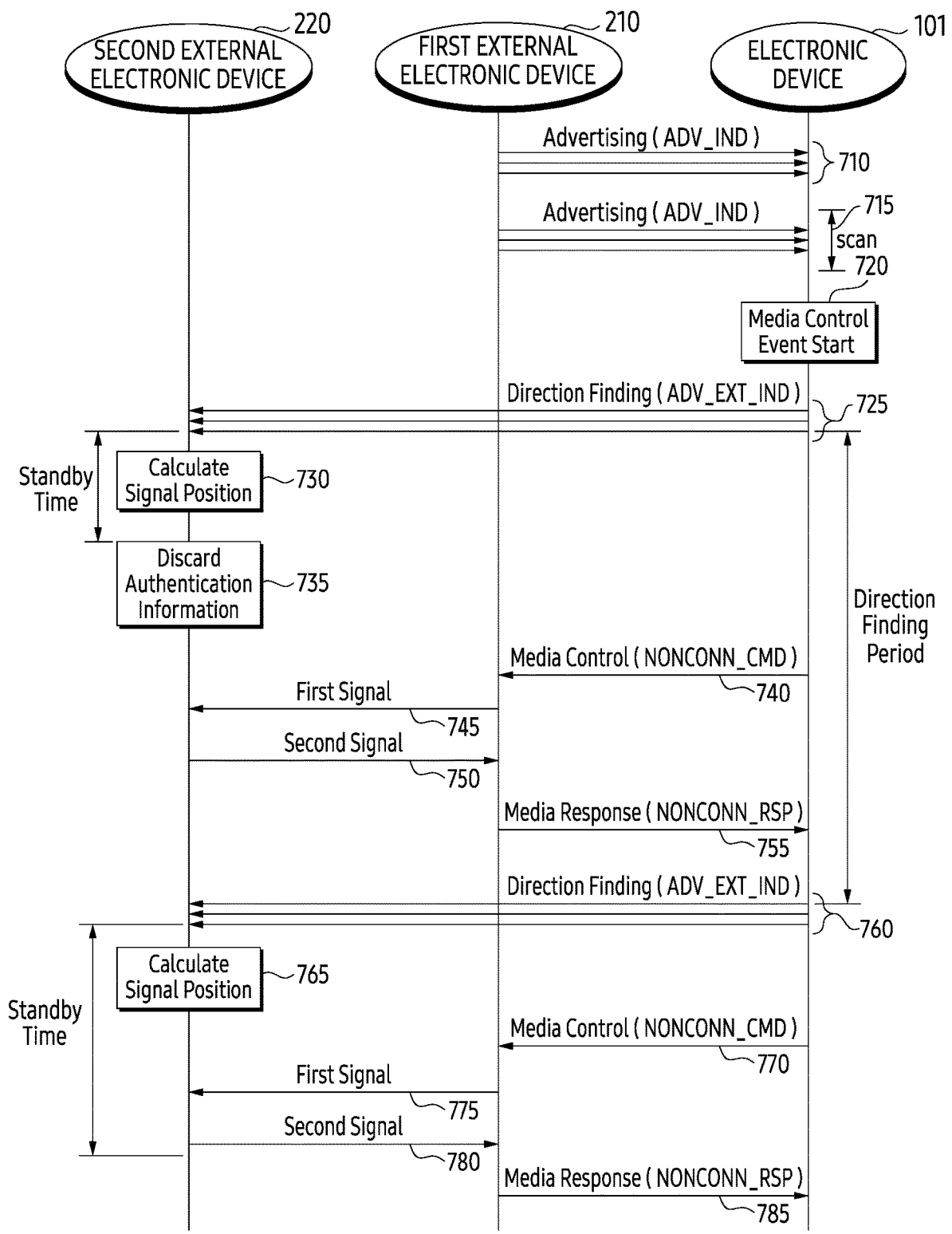
FIG. 7 illustrates a signal exchange diagram occurring in a wireless environment according to an embodiment of the disclosure.

FIG. 7 illustrates a signal exchange diagram occurring in a wireless environment according to an embodiment of the disclosure.

Referring to FIG. 7, in operation 710, the first external electronic device 210 may broadcast advertising packets. Operation 710 may correspond to operation 510 illustrated in FIG. 5.

In operation 715, the electronic device 101 may perform a scan for searching for a Bluetooth connectable device. Operation 715 may correspond to operation 515 illustrated in FIG. 5.

In operation 720, the electronic device 101 may detect a media control event. The media control event may be an event for controlling media content playable in the first external electronic device 210 identified in operation 715. Operation 720 may correspond to operation 520 illustrated in FIG. 5.

In operation 725, the electronic device 101 may broadcast advertising packets for direction identification. Operation 725 may correspond to operation 525 illustrated in FIG. 5. In operation 730, the second external electronic device 220 may calculate a signal position. Operation 730 may correspond to operation 530 illustrated in FIG. 5.

In operation 735, the second external electronic device 220 may discard the authentication information. In order to enhance security, after identifying the electronic device 101 as a Bluetooth authenticated device, when a predetermined time elapses, the second external electronic device 220 may delete the authentication information. For example, even though the electronic device 101 is located within a predetermined area by receiving advertising packets for direction identification, authentication information on the electronic device 101 may be discarded when the predetermined time elapses. The predetermined time may vary according to user settings. The predetermined time may initiate from a time point at which the broadcasting is terminated when the electronic device 101 broadcasts advertising packets for direction identification.

In operation 740, the electronic device 101 may broadcast an advertising packet for media control. Operation 740 may correspond to operation 535 illustrated in FIG. 5.

In operation 745, the electronic device 101 may transmit the first signal to the second external electronic device 220 in response to receiving advertising for media control. Operation 745 may correspond to operation 540 illustrated in FIG. 5.

In operation 750, the second external electronic device 220 may transmit the second signal to the first external electronic device 210 in response to receiving the first signal. According to various embodiments of the disclosure, when the second external electronic device 220 receives the first signal, the authentication information may already be discarded and may not exist. In operation 735, the second external electronic device 220 may delete the MAC address of the electronic device 101 by elapsing a predetermined time from the last time point when advertising packets for direction identification are received. Accordingly, in response to the receiving the first signal by the second external electronic device 220, even when the MAC address included in the first signal is retrieved from the memory 420, a matching MAC address may not be identified. Since the second external electronic device 220 fails to find authentication information corresponding to the MAC address included in the first signal, the electronic device 101 may transmit the second signal to the first external electronic device 210 by including information indicating that the device is Bluetooth unauthenticated device.

In operation 755, the first external electronic device 210 may broadcast an advertising packet for a media response. In operation 750, the first external electronic device 210 may receive a second signal including information indicating that the electronic device 101 is a Bluetooth unauthenticated device from the second external electronic device 220. The first external electronic device 210 may bypass performing a control command included in the advertising packet for media control received in operation 740 based on the second signal. In other words, the first external electronic device 210 may not perform a control command for media content received from the electronic device 101. The first external electronic device 210 may broadcast an advertising packet for the media response including information indicating that a control command included in the advertising packet for media control has not been processed. The electronic device 101 may receive the advertising packet for the media response and identify that a control command included in the advertising packet for media control broadcast in operation 740 has not been performed.

In operation 760, the electronic device 101 may broadcast advertising packets for direction identification. The broadcasting of the advertising packets for direction identification may be performed as a predetermined time elapses from the time point at which the broadcasting in operation 725 is terminated. The predetermined time may be referred to in various terms including a broadcast identification period and a Bluetooth authentication period. Alternatively, the broadcasting of advertising packets for direction identification may be performed immediately in response to receiving advertising packets for media response received in operation 755 and identifying that a control command has not been performed.

In operation 765, the second external electronic device 220 may calculate a signal position. Operation 765 may correspond to operation 730 or operation 530 illustrated in FIG. 5.

In operation 770, the electronic device 101 may broadcast advertising packets for media control, and in operation 775, the first external electronic device 210 may transmit a first signal to the second external electronic device 220. Operation 770 may correspond to operation 745 described above, and operation 775 may correspond to operation 750 described above, respectively.

In operation 780, the second external electronic device 220 may respond to the second signal to the first external electronic device 210. According to an embodiment of the disclosure, the time point at which the first signal for requesting whether to authenticate the Bluetooth of the electronic device 101 is received may precede the time point at which the authentication information is discarded. In other words, in operation 760, the second external electronic device 220 may receive the first signal within a predetermined time from the last time point when advertising packets for direction identification are received. The second external electronic device 220 may search the memory 420 for whether authentication information matching the MAC address included in the first signal exists. The second external electronic device 220 may identify authentication information matching the MAC address included in the first signal, and identify the electronic device 101 corresponding to the MAC address included in the first signal as a Bluetooth authenticated device. The second external electronic device 220 may transmit a second signal including information indicating that the electronic device 101 has been identified as a Bluetooth authenticated device to the first external electronic device 210.

In operation 785, the first external electronic device 210 may broadcast an advertising packet for a media response. In operation 780, the first external electronic device 210 may receive a second signal including information indicating that the electronic device 101 is a Bluetooth authenticated device from the second external electronic device 220. The first external electronic device 210 may perform a control command included in the advertising packet for media control received in operation 770 based on the second signal. In other words, the first external electronic device 210 may perform a control command for media content received from the electronic device 101. The first external electronic device 210 may broadcast an advertising packet for the media response including information indicating that a control command included in the advertising packet for media control has been performed. The electronic device 101 may receive the advertising packet for the media response and identify that the control command included in the advertising packet for media control broadcast in operation 770 has been performed.

According to the above-described embodiment of the disclosure, even though the electronic device 101 is identified as a Bluetooth authenticated device based on an advertising packet for direction identification, the second external electronic device 220 may discard the authentication information according to the lapse of a predetermined time. The second external electronic device 220 may more accurately determine whether the electronic device 101 requests media control of the first external electronic device 210 within a predetermined area by periodically discarding the authentication information and performing reauthentication. The second external electronic device 220 may more accurately determine whether the electronic device 101 requests media control of the first external electronic device 210 within a predetermined area.

Figure 8:
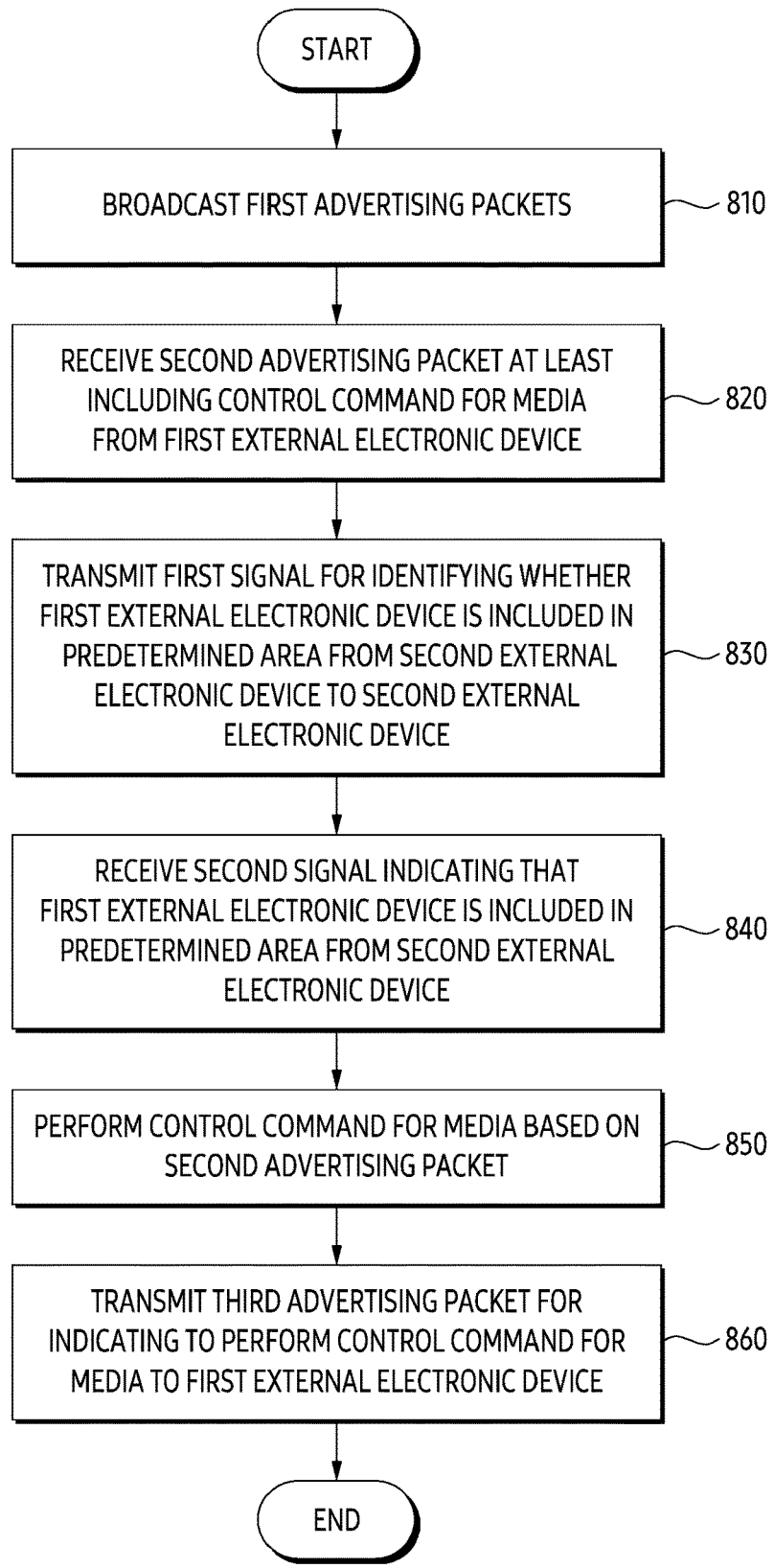
FIG. 8 is a flowchart illustrating an operation sequence of a first external electronic device according to an embodiment of the disclosure.

FIG. 8 is a flowchart illustrating an operation sequence of a first external electronic device according to an embodiment of the disclosure.

Referring to FIG. 8, in operation 810, an electronic device (e.g., the first external electronic device 210 of FIG. 2) may broadcast first advertising packets. The first advertising packets may be packets for an external device (e.g., the electronic device 101 of FIG. 2) to identify an electronic device (e.g., the first external electronic device 210 of FIG. 2). The first advertising packets may include a PDU of ADV_IND and a MAC address of an electronic device (e.g., the first external electronic device 210 of FIG. 2).

In operation 820, the electronic device (e.g., the first external electronic device 210 of FIG. 2) may receive second advertising packets including at least a control command for a media from the first external electronic device (e.g., the electronic device 101 of FIG. 2). The second advertising packets may include a control command for PDU and media content of the NONCONN_CMD and information on a MAC address of a first external electronic device (e.g., the electronic device 101 of FIG. 2).

In operation 830, the electronic device (e.g., the first external electronic device 210 of FIG. 2) may transmit a first signal for identifying that the first external electronic device (e.g., the electronic device 101 of FIG. 2) is included in a predetermined area from the second external electronic device (e.g., the second external electronic device 220 of FIG. 2) to the second external electronic device (e.g., the second external electronic device 220 of FIG. 2). The first signal may be a signal for requesting whether the first external electronic device (e.g., electronic device 101) is a Bluetooth authenticated device based on the predetermined area. The first signal may include information on a MAC address of the first external electronic device (e.g., the electronic device 101 of FIG. 2).

In operation 840, the electronic device (e.g., the first external electronic device 210 of FIG. 2) may receive a second signal indicating that the first external electronic device (e.g., the electronic device 101 of FIG. 2) is included in a predetermined area from the second external electronic device (e.g., the second external electronic device 220 of FIG. 2). The second signal may include information indicating whether the first external electronic device (e.g., the electronic device 101 of FIG. 2) is included in the predetermined area. Alternatively, the second signal may include information indicating whether the first external electronic device (e.g., the electronic device 101 of FIG. 2) indicates to a Bluetooth authenticated device.

In operation 850, the electronic device (e.g., the first external electronic device 210 of FIG. 2) may perform a control command on the media based on the second advertising packet. The electronic device (e.g., the first external electronic device 210 of FIG. 2) may perform a control command included in the already received second advertising packet. For example, when the control command indicates volume up, the electronic device (e.g., the first external electronic device 210 of FIG. 2) may control the electronic device (e.g., the first external electronic device 210 of FIG. 2) to reduce sound by reducing output of the speaker.

In operation 860, the electronic device (e.g., the first external electronic device 210 of FIG. 2) may transmit a third advertising packet to the first external electronic device (e.g., the electronic device 101 of FIG. 2) for indicating that a control command of the media has been performed. The third advertising packet may include information indicating a PDU of the NONCONN_RSP and a result of performing a control command.

Figure 9:
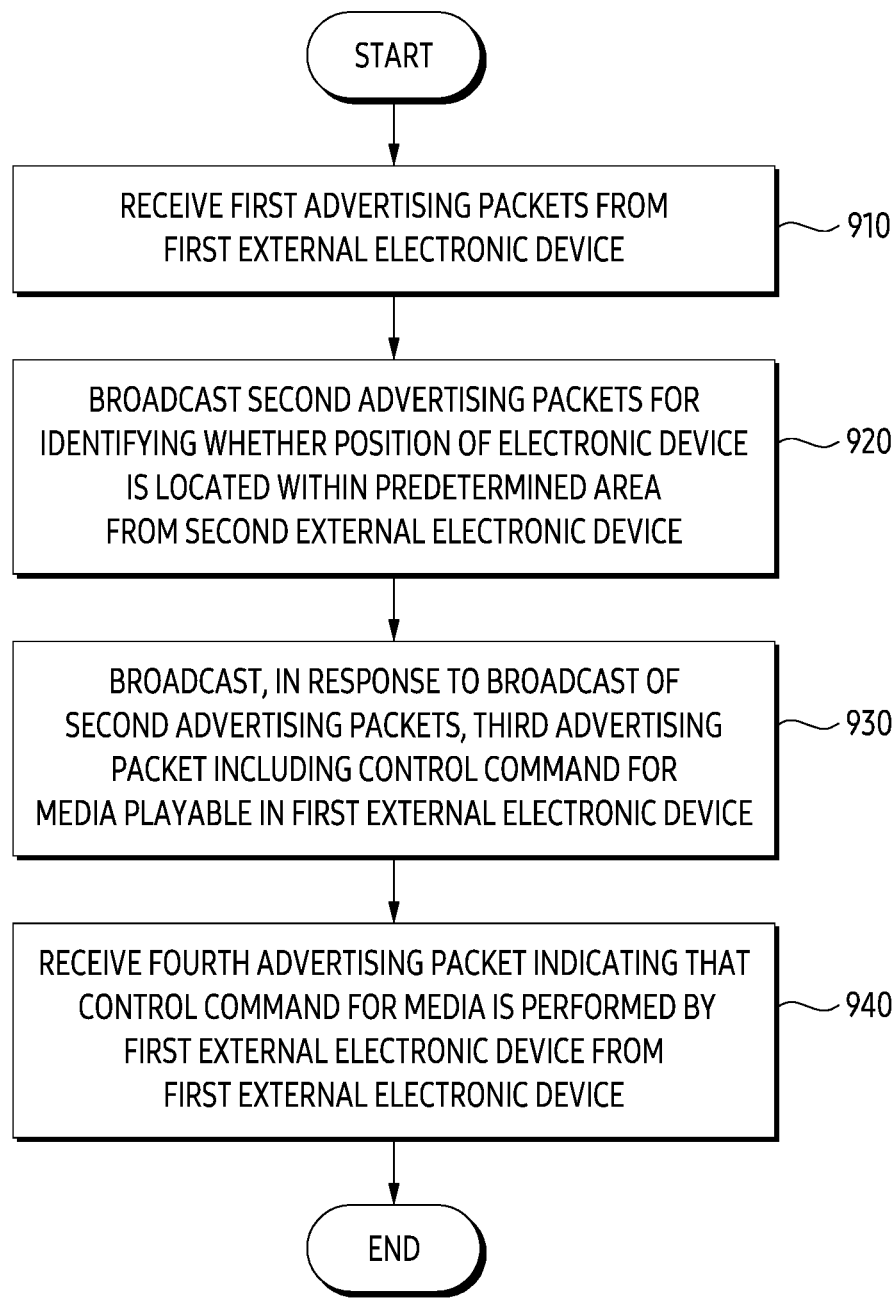
FIG. 9 is a flowchart illustrating an operation sequence of an electronic device according to an embodiment of the disclosure.

FIG. 9 is a flowchart illustrating an operation sequence of an electronic device according to an embodiment of the disclosure.

Referring to FIG. 9, in operation 910, the electronic device 101 may receive a first advertising packet from the first external electronic device 210. The first advertising packet may correspond to a packet for the electronic device 101 to identify the first external electronic device 210. The first advertising packet may include information on the PDU of the ADV_IND and the MAC address of the first external electronic device 210. The electronic device 101 may periodically perform a scan, and during the scan, may identify the first external electronic device 210 in response to receiving the first advertising packets.

In operation 920, the electronic device 101 may broadcast second advertising packets for identifying whether the electronic device 101 is located within a predetermined area from the second external electronic device 220. The second advertising packets may correspond to advertising packets for direction identification. The second advertising packets may include a PDU of ADV_EXT_IND, a MAC address of the electronic device 101, and a CTE. The second advertising packets may be used by the second external electronic device 220 to identify the position of the electronic device 101. For example, the second external electronic device 220 may identify an arrival angle and/or a departure angle for the second advertising packets based on the CTE included in the second advertising packets. The second external electronic device 220 may identify a distance from the electronic device 101 based on a received strength of the second advertising packets. According to an embodiment of the disclosure, the electronic device 101 may broadcast the second advertising packets in response to identifying the initiation of the media control event.

In operation 930, the electronic device 101 may broadcast a third advertising packet including a control command regarding media playable in the first external electronic device 210 in response to broadcasting of the second advertising packets. The third advertising packet may be a packet for performing control of media content through the first external electronic device 210. For example, the third advertising packet may include a PDU of NONCONN_CMD, information on the control command, and information on a MAC address of the electronic device 101. The information on the control command may include information indicating a volume up, a volume down, play next song, play previous song, play current song, and pause current song.

In operation 940, the electronic device 101 may receive a fourth advertising packet, indicating that a control command for media is performed by the first external electronic device, from the first external electronic device.

According to an embodiment of the disclosure, the electronic device and the operating method can identify a device capable of performing connectionless communication based on an indoor positioning system (IPS), and control media contents without releasing an existing pairing with another electronic device by transmitting and receiving advertising packets of a new protocol data unit (PDU) with the identified device.

According to the above-described embodiment of the disclosure, an electronic device may comprise a communication circuit for Bluetooth low energy (BLE), at least one memory configured to store instructions, and at least one processor operatively coupled with the communication circuit, wherein the at least one processor, when the instructions are executed, may be configured to broadcast first advertising packets via the communication circuit, receive, via the communication circuit from a first external electronic device, second advertising packets at least including a control command for media playable in the electronic device, transmit, in response to receiving the second advertising packets, a first signal for identifying whether the first external electronic device is included in a predetermined area from a second external electronic device, via the communication circuit to the second external electronic device, wherein the first external electronic device is distinct from the second external electronic device, receive, from the second external electronic device via the communication circuit, a second signal generated in response to the first signal, perform, in response to receiving the second signal indicating that the first external electronic device is included in the predetermined area via the communication circuit, a control command for the media, and transmit, via the communication circuit to the first external electronic device, a third advertising packet for indicating to perform the control command for the media.

According to an embodiment of the disclosure, the second external electronic device may correspond to an indoor positioning system (IPS) device for identifying a position of the first external electronic device, based on fourth advertising packets broadcasted from the first external electronic device by using a received time and a received strength of the fourth advertising packets received through at least three antennas.

According to an embodiment of the disclosure, the first advertising packet may include a protocol data unit (PDU) of advertising indications (ADV_IND).

According to an embodiment of the disclosure, the second advertising packet may correspond to an advertising packet that is non-scannable, undirected, and non-connectable.

According to an embodiment of the disclosure, the control command for the media that is playable may include at least one of a volume up, a volume down, play next song, play previous song, play the media, or pause the media being played.

According to an embodiment of the disclosure, the fourth advertising packets may correspond to packets broadcasted from the first external electronic device at a predetermined time intervals, and wherein a protocol data unit (PDU) of the fourth advertising packets may correspond to an ADV_EXT_IND.

According to an embodiment of the disclosure, the second advertising packets may be received from the first external electronic device before receiving an advertising packet that requests a Bluetooth connection between the electronic device and the first external electronic device.

According to an embodiment of the disclosure, an electronic device may comprise a communication circuit for Bluetooth low energy (BLE), at least one memory configured to store instructions, and at least one processor operatively coupled with the communication circuit, wherein the at least one processor, when the instructions are executed, may be configured to receive first advertising packets via the communication circuit from a first external electronic device, broadcast, in response to receiving the first advertising packets, second advertising packets for identifying whether a position of the electronic device is located within a predetermined area from a second external electronic device, via the communication circuit to the second external electronic device, transmit, via the communication circuit to the first external electronic device, a third advertising packet at least including a control command for media playable in the first external electronic device, and receive, from the first external electronic device via the communication circuit, a fourth advertising packet for indicating that the control command is performed by the first external electronic device in response to the third advertising packet on a condition that the position of the electronic device is located within the predetermined area from the second external electronic device.

According to an embodiment of the disclosure, the second external electronic device may correspond to an indoor positioning system (IPS) device for identifying the position of the electronic device based on a received time and a received strength of the second advertising packets received through at least three antennas included in the second external electronic device.

According to an embodiment of the disclosure, the first advertising packet may include a protocol data unit (PDU) of an ADV_IND.

According to an embodiment of the disclosure, the third advertising packet may correspond to an advertising packet that is non-scannable, undirected, and non-connectable.

According to an embodiment of the disclosure, the control command for the media that is playable may include at least one of a volume up, a volume down, play next song, play previous song, play the media, or pause the media being played.

According to an embodiment of the disclosure, the second advertising packets may correspond to packets broadcasted at predetermined time intervals, and wherein a protocol data unit (PDU) of the second advertising packets may correspond to ADV_EXT_IND.

According to an embodiment of the disclosure, the third advertising packet may be transmitted to the first external electronic device before receiving an advertising packet that requests a Bluetooth connection between the electronic device and the first external electronic device.

According to an embodiment of the disclosure, the at least one processor is, when the instructions are executed, configured to transmit a dummy packet to the first external electronic device before transmitting the third advertising packet in response to transmitting the second advertising packets to the second external electronic device, and wherein the dummy packet may have a protocol data unit (PDU) identical to a PDU of the third advertising packet.

According to an embodiment of the disclosure, a method of an electronic device including a communication circuit for a Bluetooth low energy (BLE) may comprise broadcasting first advertising packets via the communication circuit, receiving, via the communication circuit from a first external electronic device, second advertising packets at least including a control command for media playable in the electronic device, transmitting, in response to receiving the second advertising packets, a first signal for identifying whether the first external electronic device is included in a predetermined area from a second external electronic device, via the communication circuit to the second external electronic device, wherein the first external electronic device is distinct from the second external electronic device, receiving, from the second external electronic device via the communication circuit, a second signal generated in response to the first signal, performing, in response to receiving the second signal indicating that the first external electronic device is included in the predetermined area via the communication circuit, a control command for the media, and transmitting, via the communication circuit to the first external electronic device, a third advertising packet for indicating to perform the control command for the media.

According to an embodiment of the disclosure, the control command for the media that is playable may include at least one of a volume up, a volume down, play next song, play previous song, play the media, or pause the media being played.

According to an embodiment of the disclosure, the second advertising packet may correspond to an advertising packet that is non-scannable, undirected, and non-connectable.

According to an embodiment of the disclosure, the second signal may be identified based on a received time and a received strength of fourth advertising packets, broadcasted from the first external electronic device, received through at least three antennas of the second external electronic device.

According to an embodiment of the disclosure, the second advertising packet may be received from the first external electronic device, before receiving an advertising packet that requests a Bluetooth connection between the electronic device and the first external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   communication circuitry for Bluetooth low energy (BLE);
   memory comprising one or more storage media storing instructions; and
   at least one processor comprising processing circuitry,
   wherein the instructions, when executed by the at least one processor, cause the electronic device to:
   broadcast a first advertising packet via the communication circuitry,
   receive, via the communication circuitry, a second advertising packet broadcasted from a first external electronic device based on the first advertising packet, the second advertising packet at least including a control command for media playable in the electronic device,
   in response to receiving the second advertising packet, transmit a first signal for identifying whether the first external electronic device is included in a defined area from a second external electronic device, via the communication circuitry, through an established communication link between the electronic device and the second external electronic device, to the second external electronic device, wherein the first external electronic device is distinct from the second external electronic device;
   receive, through the established communication link, from the second external electronic device via the communication circuitry, a second signal generated in response to the first signal,
   in response to receiving the second signal indicating that the first external electronic device is included in the defined area via the communication circuitry, perform the control command for the media, and
   based on performing the control command for the media, broadcast, via the communication circuitry, a third advertising packet, for indicating to the first external electronic device, that the control command for the media has been performed.

2. The electronic device of claim 1, wherein the second external electronic device corresponds to an indoor positioning system (IPS) device for identifying a position of the first external electronic device, based on a received time and a received strength of a fourth advertising packet that is broadcasted from the first external electronic device and is received through at least three antennas of the second external electronic device.

3. The electronic device of claim 2,
   wherein the fourth advertising packet corresponds to a packet broadcasted from the first external electronic device at defined time intervals, and
   wherein a protocol data unit (PDU) of the fourth advertising packet corresponds to an advertising extended indication (ADV_EXT_IND).

4. The electronic device of claim 1, wherein the first advertising packet includes a protocol data unit (PDU) of an advertising indication (ADV_IND).

5. The electronic device of claim 1, wherein the second advertising packet corresponds to an advertising packet that is non-scannable, undirected, and non-connectable.

6. The electronic device of claim 1, wherein the control command for the media that is playable includes a volume up, a volume down, play next song, play previous song, play the media, and/or pause the media being played.

7. The electronic device of claim 1, wherein the second advertising packet is received from the first external electronic device before receiving an advertising packet that requests a Bluetooth connection between the electronic device and the first external electronic device.

8. A method of an electronic device including a communication circuitry for Bluetooth low energy (BLE), the method comprising:
   broadcasting a first advertising packet via the communication circuitry;
   receiving, via the communication circuitry, a second advertising packet broadcasted from a first external electronic device based on the first advertising packet, the second advertising packet at least including a control command for media playable in the electronic device;

in response to receiving the second advertising packet, transmitting a first signal for identifying whether the first external electronic device is included in a defined area from a second external electronic device, via the communication circuitry, through an established communication link between the electronic device and the second external electronic device, to the second external electronic device, wherein the first external electronic device is distinct from the second external electronic device;

receiving, through the established communication link, from the second external electronic device, via the communication circuitry, a second signal generated in response to the first signal;

in response to receiving the second signal indicating that the first external electronic device is included in the defined area via the communication circuitry, a performing the control command for the media; and based on performing the control command for the media, broadcasting, via the communication circuitry, a third advertising packet, for indicating, to the first external electronic device, that the control command for the media has been performed.

9. The method of claim 8, wherein the control command for the media that is playable includes a volume up, a volume down, play next song, play previous song, play the media, and/or pause the media being played.

10. The method of claim 8, wherein the second advertising packet corresponds to an advertising packet that is non-scannable, undirected, and non-connectable.

11. The method of claim 8, wherein the second signal is generated based on a received time and a received strength of a fourth advertising packet, broadcasted from the first external electronic device, received through at least three antennas of the second external electronic device.

12. The method of claim 8, wherein the second advertising packet is received from the first external electronic device, before receiving an advertising packet that requests a Bluetooth connection between the electronic device and the first external electronic device.

* * * * *